# United States Patent

Yung et al.

(10) Patent No.: US 7,849,730 B2
(45) Date of Patent: Dec. 14, 2010

(54) DEVICE FOR TESTING THE PERFORMANCE OF A SEALANT FOR SOFC STACKS

(75) Inventors: Tung-Yuan Yung, Bade (TW); Chien-Kuo Liu, Taoyuan County (TW); Kin-Fu Lin, Taipei (TW); Szu-Han Wu, Taoyuan (TW)

(73) Assignee: Atomic Energy Council-Institute of Nuclear Energy Research, Taoyuan (TW)

( * ) Notice: Subject to any disclaimer, the term of this patent is extended or adjusted under 35 U.S.C. 154(b) by 78 days.

(21) Appl. No.: 11/987,400

(22) Filed: Nov. 29, 2007

(65) Prior Publication Data

US 2010/0180670 A1   Jul. 22, 2010

(51) Int. Cl.
*G01M 3/04* (2006.01)
*G01N 15/00* (2006.01)
(52) U.S. Cl. ........................... 73/49.8; 73/865.6
(58) Field of Classification Search ............... 73/49.8, 73/865.6, 150 A
See application file for complete search history.

(56) References Cited

U.S. PATENT DOCUMENTS

| | | | | |
|---|---|---|---|---|
| 2,707,390 A | * | 5/1955 | Beretish | 73/46 |
| 4,552,011 A | * | 11/1985 | Wiley | 73/1.69 |
| 5,375,453 A | * | 12/1994 | Rudd et al. | 73/37 |

* cited by examiner

*Primary Examiner*—Hezron Williams
*Assistant Examiner*—Nathaniel Kolb
(74) *Attorney, Agent, or Firm*—Jackson IPG PLLC; Demian K. Jackson

(57) ABSTRACT

An apparatus is disclosed for testing the performance of a sealant for solid oxide fuel cell packs. The apparatus includes an oven including a base, a platform provided on the base and a frame connected to the platform. An elevator is used to raise and lower the oven. A pressuring and testing chamber is provided on the platform. The pressuring and testing chamber includes a first body and a second body connected to the first body. A carrier is provided between the first and second bodies. The carrier includes a first plate and a second plate so that the sealant can be provided between the first and second plates. A pusher includes an end connected to the frame and another end for pushing the second plate. A pusher-driving unit is connected to the frame for raising and lowering the pusher.

6 Claims, 1 Drawing Sheet

DEVICE FOR TESTING THE PERFORMANCE OF A SEALANT FOR SOFC STACKS

BACKGROUND OF INVENTION

1. Field of Invention

The present invention relates to solid oxide fuel cell ("SOFC") stacks and, more particularly, to an apparatus for testing the performance of a sealant for SOFC stacks.

2. Related Prior Art

Sealants for use in SOFC stacks include glass-ceramic materials or glass mica. The performance of such a sealant at high temperatures must be acceptable at high temperatures. The long-term monitoring of the rate of leakage through such a sealant is important in the evaluation of the performance of the sealant.

Glass-ceramic materials have successively been used as sealants for SOFC stacks in some laboratories. The recipes and thermal properties of the glass-ceramic materials are acceptable for use in the laboratories. However, the glass-ceramic materials have not been commercially available because there has not been any proper device or standard process to measure the rates of leakage therein and monitor the performance thereof in different environments at different temperatures for long periods of time.

The present invention is therefore intended to obviate or at least alleviate the problems encountered in prior art.

SUMMARY OF INVENTION

It is the primary objective of the present invention to provide an apparatus for testing the performance of a sealant for SOFC stacks.

To achieve the foregoing objective, the apparatus includes an oven including a base, a platform provided on the base and a frame connected to the platform. An elevator is used to raise and lower the oven. A pressuring and testing chamber is provided on the platform. The pressuring and testing chamber includes a first body and a second body connected to the first body. A carrier is provided between the first and second bodies. The carrier includes a first plate and a second plate so that the sealant can be provided between the first and second plates. A pusher includes an end connected to the frame and another end for pushing the second plate. A pusher-driving unit is connected to the frame for raising and lowering the pusher.

Other objectives, advantages and features of the present invention will become apparent from the following description referring to the attached drawings.

BRIEF DESCRIPTION OF DRAWING

The present invention will be described via the detailed illustration of the preferred embodiment referring to the drawing.

DETAILED DESCRIPTION OF PREFERRED EMBODIMENT

Figure 1:
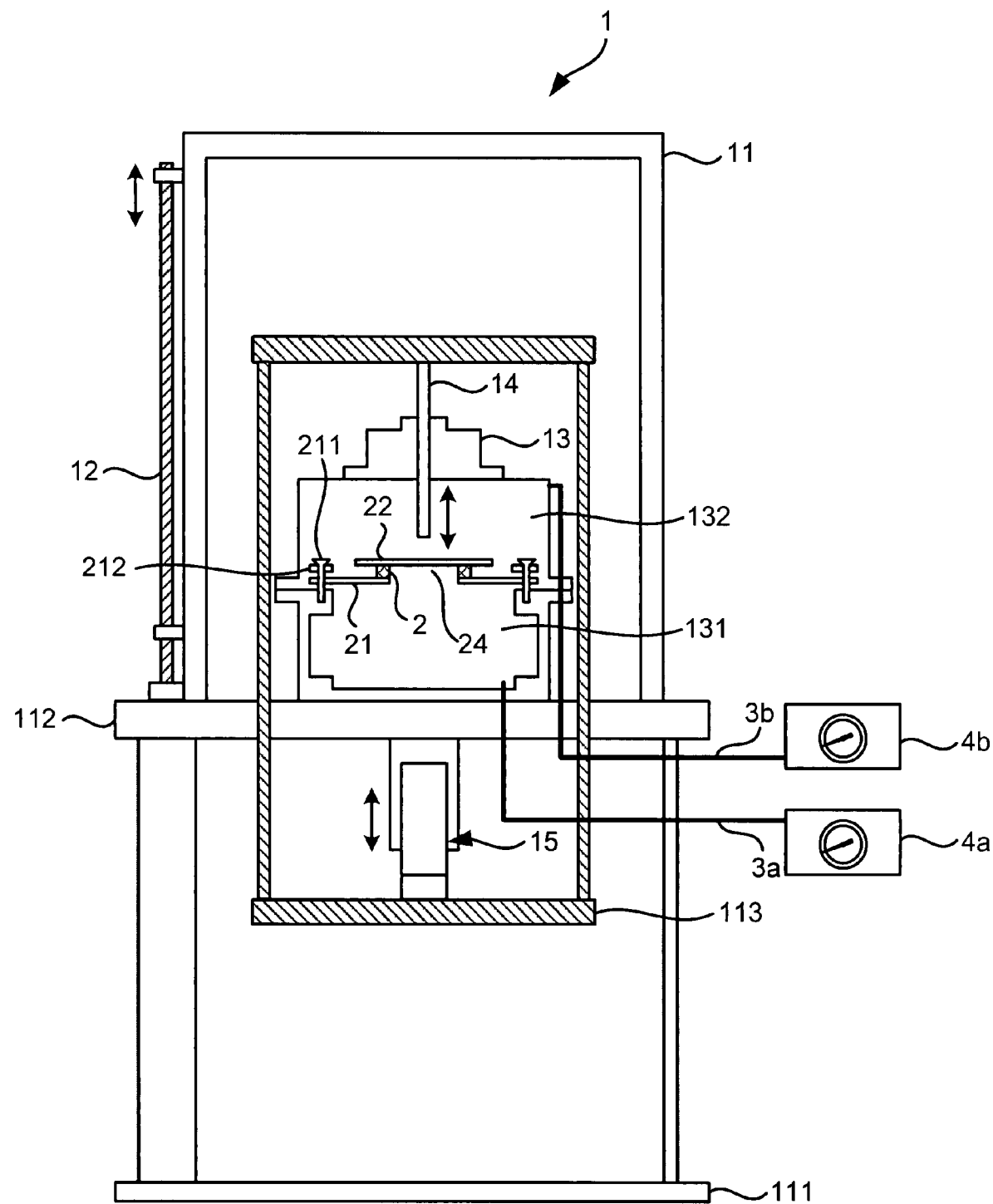
FIG. 1 is a front view of an apparatus for testing the performance of a sealant for a SOFC stack according to the preferred embodiment of the present invention.

Referring to FIG. 1, there is shown an apparatus 1 for measuring the rate of leakage through a sealant 2 for SOFC stacks according to the preferred embodiment of the present invention. The apparatus 1 includes an oven 11, an elevator 12, a pressurizing and testing chamber 13, a pusher 14 and a pusher-driving unit 15.

The oven 11 is in the shape of a cylinder. The oven 11 includes a base 111, a platform 112 provided on the base 111 and a frame 113 connected to the platform 112.

The elevator 12 is in the form of a threaded bolt. The elevator 12 is provided on a side of the oven 11. The elevator 12 is used to raise and lower the oven 11.

The pressuring and testing chamber 13 includes a first body 131 and a second body 132 connected to the first body 131. A first pipe 3a includes an end in communication with the first body 131 and another end in communication with a first pressure gauge 4a. A second pipe 3b includes an end in communication with the second body 132 and another end in communication with a second pressure gauge 4b.

A carrier is provided between the first body 131 and the second body 132.

The carrier includes a first plate 21 and a second plate 22. The first plate 21 includes an aperture 24 defined therein. The first plate 21 is attached to the first body 131 by threaded bolts 211. Each of the threaded bolts 211 is inserted through a washer 212 before it is driven into the lower body 131. The second plate 22 is located above the first plate 21, over the aperture 24

The pusher 14 is in the form of a rod including an end connected to the frame 113 and an opposite end inserted into the second body 132. The pusher 14 is used to push the second plate 22.

The pusher-driving unit 15 is provided on the frame 113. The pusher-driving unit 15 is used to raise and lower the pusher 14.

In operation, the sealant 2 is provided between the first plate 21 and the second plate 22, around the aperture 24 so that the aperture 24 is sealed by the sealant 2. The sealant 2 may be a glass-ceramic material for example. Air or gas is transferred into the first body 131 through the first pipe 3a to generate a first pressure $P_1$ measured by the first pressure gauge 4a. Air or gas is transferred into the second body 132 through the second pipe 3b to generate a second pressure $P_2$ measured by the second pressure gauge 4b. The pressure difference $\Delta P$ between the first pressure $P_1$ and the second pressure $P_2$ ($\Delta P = P_2 - P_1$) is initially calculated before the supply of the air or gas is stopped. Then, the pressure difference $\Delta P$ is monitored. The pressure difference $\Delta P$ will get smaller if there is leakage through the sealant 2. In such leakage, the pusher-driving unit 15 is actuated to lower the pusher 14 to push the second plate 22 towards the first plate 21, thus compressing the sealant 2 harder and therefore stopping the leakage. The load exerted on the second plate 22 by the pusher 14 is measured and used as an important parameter in commercial use of the sealant 2 in SOFC stacks.

The foregoing process can be repeated at various initial readings of the pressure difference $\Delta P$ to test the performance of the sealant 2 at various pressure difference $\Delta P$. The foregoing process can be repeated at various temperatures to test the performance of the sealant 2 at various temperatures.

As discussed above, the apparatus 1 can be used to effectively test the performance of the sealant 2 such as mechanical properties and durability at various temperatures and at various initial readings of the pressure difference. In the case of leakage, the load exerted on the second plate 22 by the pusher 14 to stop the leakage is measured and used as an important parameter in commercial use of the sealant 2 in SOFC stacks. The carrier can be made of various sizes so that the performance of the sealant 2 of various lengths can be evaluated. Furthermore, various gases can be transferred into the first body 131 and the second body 132 so that the performance of the sealant 2 therein can be evaluated.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. An apparatus for testing the performance of a sealant for solid oxide fuel cell stacks, the apparatus comprising:
    an oven comprising a base, a platform provided on the base and a frame connected to the platform;
    an elevator for raising and lowering the oven;
    a pressuring and testing chamber provided on the platform, the pressuring and testing chamber comprising a first body and a second body connected to the first body;
    sealant for solid oxide fuel cell stacks;
    a carrier provided between the first and second bodies, the carrier comprising a first plate wherein the first plate comprises an aperture and a second plate wherein the sealant is provided around the aperture and between the first and second plates such that the aperture is sealed by the sealant;
    a pusher comprising an end connected to the frame and another end for pushing the second plate; and
    a pusher-driving unit connected to the frame for raising and lowering the pusher so as to increase compression on the sealant between the first and the second plates when leakage is detected so as to stop the leakage.

2. The apparatus according to claim 1 comprising:
    a first pipe in communication with the first body so that gas can be transferred into the first body through the first pipe to generate a first pressure in the first body; and
    a first pressure gauge in communication with the first pipe so that the first pressure is measured by the first pressure gauge.

3. The apparatus according to claim 2 comprising:
    a second pipe in communication with the second body so that gas can be transferred into the second body through the second pipe to generate a second pressure in the second body; and
    a second pressure gauge in communication with the second pipe so that the second pressure is measured by the second pressure gauge.

4. The apparatus according to claim 1 comprising a plurality of threaded bolts for attaching the first plate to the first body.

5. The apparatus according to claim 4 comprising a washer between the head of each of the threaded bolts and the first body.

6. The apparatus according to claim 1, wherein there is a pressure difference between the pressure in the first body and the pressure in the second body.

* * * * *